United States Patent Office 2,702,805
Patented Feb. 22, 1955

2,702,805
PRODUCTION OF STEROIDS

Robert B. Woodward, Belmont, Mass., assignor to Research Corporation, New York, N. Y., a corporation of New York No Drawing. Application May 19, 1953,
Serial No. 356,085

3 Claims. (Cl. 260—340.5)

This application relates to methods and compounds useful in the production of steroids, particularly the adrenal cortical hormones such as cortisone.

In application Serial No. 220,977, filed April 13, 1951, is disclosed methods and compounds whereby the cis-adduct of 1,2-butadiene and 2-methyl-5-methoxybenzoquinone may be converted into a $\Delta^{9(11),16}$-bisdehydro-21-norprogesterone capable of further conversion into steroid hormones. See, for example, Journal of the American Chemical Society 73, 3547, 3548 and 4057 (1951).

This application relates to an improved method of converting the β-isomer of 1-(β-carboxyethyl)-1,14-dimethyl-2-keto-6,7-dihydroxy-$\Delta^{10}$-dodecahydrophenanthrene acetonide (XVb)

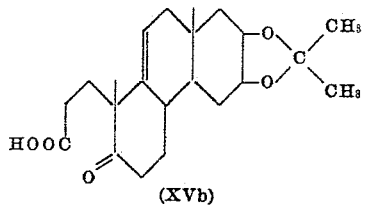

(XVb)

into the D-homosteroid (XVII)

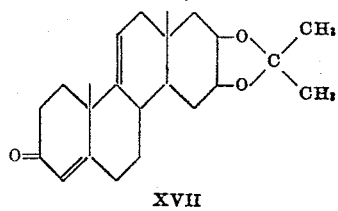

XVII and to the product thereby obtained.

It has been found that by converting the carboxyethyl compound (XVb) into the lactone (XVI)

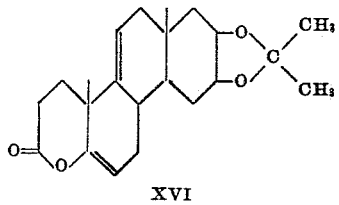

XVI and cyclizing the latter compound into the D-homosteroid (XVII) by reaction with a methyl Grignard reagent and treating the reaction product wtih a base, the lactone from the α-isomer (XVb)

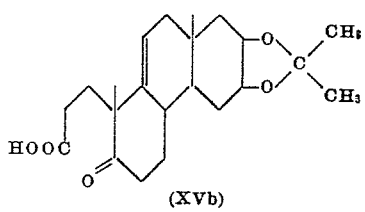

(XVb)

which is very difficult to separate completely from the β-isomer, is not converted to a tetracyclic ketone if the reaction with the Grignard reagent is maintained at a temperature well below −35° C.

3-keto - 16,17 - dihydroxy - $\Delta^{5,9,(11)}$ - 4 -oxa - D - homoandrostadiene acetonide (XVI)

Crude β acid (13.4 g.) prepared as described in application Serial No. 220,977 is dissolved in pure acetic anhydride (100 cc.) and the solution refluxed in an atmosphere of nitrogen for 2 hours. At this point anhydrous sodium acetate (0.1 g.) is added, and the mixture refluxed for an additional 2 hours. The mixture is then evaporated to dryness and heated for 1 hour at 100° C. and 1 mm. to remove the acetic anhydride leaving crude enol lactone (XVI).

3-keto-16,17 - dihydroxy - $\Delta^{4,9(11)}$ - D - homoandrostadiene acetonide

The crude enol lactone (ca. 13.5 g.) prepared as described in the foregoing is dissolved in a mixture of anhydrous benzene (80 cc.) and anhydrous ether (200 cc.) and the solution cooled to −55° C. During 35 minutes, 310 cc. (300% excess) of a 0.48 N solution of methylmagnesium bromide in ether is added to the well stirred mixture at −55° C.; a heavy precipitator forms at this point. The mixture is stirred at −45° C. to −55° C. for 4 hours, then poured into 0.5 N aqueous hydrochloric acid (500 cc.); the resulting mixture is shaken vigorously and then quickly separated. The extraction is repeated twice with chloroform, the extracts combined and washed with water; sodium hydroxide (1 g.) is added and the solvents are removed in vacuo. The crude product (14.1 g. exclusive of the alkali) is dissolved in methanol (1000 cc.), sodium hydroxide (10.0 g.) in water (100 cc.) is added and the solution refluxed in a nitrogen atmosphere for 2.5 hours. The methanol is then removed in vacuo and the residue thoroughly extracted with chloroform. The extracts are washed with water and evaporated in vacuo to yield 9.8 g. of crude product which is dissolved in benzene and passed over 100 g. of neutral alumina. The benzene and either eluates are combined and evaporated in vacuo to yield 4.45 g. of crystalline material which is recrystallized from methanol to yield 3.75 g. of 3-keto-16,17 - dihydroxy - $\Delta^{4,9(11)}$-D - homoandrostadiene acetonide XVII, M. P. 198–201° C. (raised to 200–202° C. by recrystallization from methanol).

The method of the invention is effective with other alkyl groups protecting the adjacent hydroxyl groups, including either two monovalent alkyls or a bivalent alkylene group.

This application is a continuation-in-part of my application Serial No. 220,977, filed April 13, 1951.

Methods of producing steroids from the compounds of the invention as described in my application Serial No. 356,086, filed May 19, 1953, now U. S. Patent No. 2,675,396.

I claim:
1. The method of cyclizing lactones of the general formula

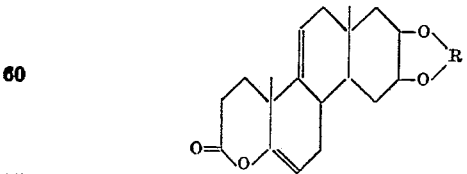

wherein R is selected from the group consisting of two lower alkyl groups and a single lower alkylene group, which comprises reacting the lactone with a methyl Grignard reagent at a temperature not exceeding −35° C., treating the reaction product with a base and recovering the D-homosteroid of the formula

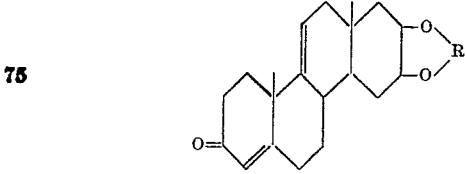

thereby produced.

2. The method of producing the acetonide of 3-keto- 16,17-dihydroxy - $\Delta^{4,9(11)}$ - D - homoandrostadiene which comprises reacting a lactone of the formula

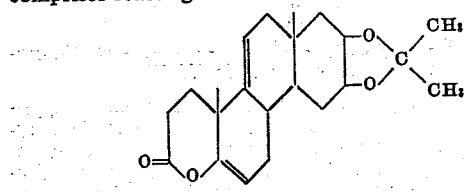

with a methyl Grignard reagent at a temperature not exceeding —35° C., treating the reaction product with a base and separating the acetonide of 3-keto-16,17-dihydroxy-$\Delta^{4,9(11)}$-D-homoandrostadiene thereby produced.

3. The acetonide of 3-keto-16,17-dihydroxy-$\Delta^{4,9(11)}$-D-homoandrostadiene of the formula

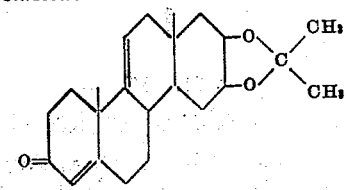

No references cited.